UNITED STATES PATENT OFFICE.

FRANÇOIS LEBREIL, OF VILLEURBANNE, RHÔNE, AND RAOUL DESGEORGE, OF LYON, FRANCE.

PROCESS FOR THE PREPARATION OF PLASTIC CASEIN.

1,189,841.      Specification of Letters Patent.      Patented July 4, 1916.

No Drawing.      Application filed December 8, 1911. Serial No. 664,672.

*To all whom it may concern:*

Be it known that we, FRANÇOIS LEBREIL and RAOUL DESGEORGE, citizens of the French Republic, residing, respectively, at Villeurbanne, Rhône, and Lyon, both in France, have invented a certain new and useful Improvement in Processes for the Preparation of Plastic Casein, of which the following is a specification.

The process which forms the object of the present invention is for the purpose of obtaining a plastic casein which may be formed into sheets similar to celluloid sheets, or which may be given the necessary viscosity to be spun like silk.

The present process consists in allowing the casein to transform naturally or to chemically facilitate the development of acetic, lactic or other bacteria as required while assisting the fermentation in a medium suitable to their development. The casein is then treated as known with acetone, the treatment being effected in the known manner in a closed vessel wherein it is heated under pressure or it is otherwise subjected to similar treatment.

It is preferable to operate on a casein prepared in the following manner which gives a homogeneous fermentation in all the mass:

About 250 liters of skimmed milk is heated in an open and preferably steam-heated vessel to a temperature of 35 degrees centigrade and about 300 cubic centimeters of commercial rennet is then added. Immediately coagulation commences the temperature of the mass is raised rapidly to 75 degrees C., when the heating steam is cut off and at this moment the casein takes a cellular appearance and rises above the vessel. This cellular state resembling that of bread crumbs allows of determining by microscopic examination the degree of fermentation which is suitable to the application for which the product is required. The casein thus obtained is then exposed for about 12 hours upon screens arranged in a chamber heated to 15 degrees C. The development of acetic bacteria (*Mycoderma aceti*) in the mass can then be ascertained and this development is sufficient to now commence to treat the substance with the acetone. The development of bacteria can be arrested or lessened by the addition of a mineral salt or acid to the mass or by cooling the same.

What we claim as our invention and desire to secure by Letters Patent of the United States is:—

The herein described process for the production of a casein adapted to the working of plastic substances, which consists in heating skimmed milk to a temperature of 35° C., adding rennet thereto, raising the temperature of the mass upon the commencement of coagulation to a temperature of 75° C. and then exposing the casein to a temperature of 15° C. for about 12 hours.

In witness whereof we have signed this specification in the presence of two witnesses.

FRANÇOIS LEBREIL.
RAOUL DESGEORGE.

Witnesses:
GASTON YEAUNIAUX,
MONIAS N. BROWN.